(12) United States Patent
Sorensen

(10) Patent No.: US 7,792,834 B2
(45) Date of Patent: Sep. 7, 2010

(54) PERVASIVE MEDIA INFORMATION RETRIEVAL SYSTEM

(75) Inventor: Christopher Donald Sorensen, Struer (DK)

(73) Assignee: Bang & Olufsen A/S, Stuer (DK)

( * ) Notice: Subject to any disclaimer, the term of this patent is extended or adjusted under 35 U.S.C. 154(b) by 193 days.

(21) Appl. No.: 11/795,720

(22) PCT Filed: Feb. 24, 2006

(86) PCT No.: PCT/DK2006/000111

§ 371 (c)(1),
(2), (4) Date: May 28, 2008

(87) PCT Pub. No.: WO2006/089555

PCT Pub. Date: Aug. 31, 2006

(65) Prior Publication Data

US 2009/0157685 A1    Jun. 18, 2009

(30) Foreign Application Priority Data

Feb. 25, 2005 (DK) .............................. 2005 00289

(51) Int. Cl.
G06F 7/00 (2006.01)
G06F 17/30 (2006.01)
(52) U.S. Cl. .................. 707/736; 707/770; 706/12; 706/13; 706/14
(58) Field of Classification Search .................. 707/736, 707/770; 706/12–14
See application file for complete search history.

(56) References Cited

U.S. PATENT DOCUMENTS 5,740,364 A    4/1998    Drerup
7,647,318 B1 *    1/2010    Enns et al. .................... 1/1

FOREIGN PATENT DOCUMENTS

EP    0 964 342 A2    12/1999

OTHER PUBLICATIONS

Kohtake et al., InfoStick: an interaction device for Inter-Appliance Computing), Department of computer science, 13 pages.*
Naohiko Kohtake et al. "InfoStick: an interaction device for Inter-Appliance Computing". Department of Computer Science, Keio University, vol. 1707, pp. 246-258. 1999.

(Continued)

Primary Examiner—John R. Cottingham
Assistant Examiner—Noosha Arjomandi
(74) Attorney, Agent, or Firm—Harness, Dickey & Pierce, P.L.C.

(57) ABSTRACT

A pervasive information retrieval system is disclosed in consumer electronics and home entertainment for retrieval of audio and visual information but also information containing text, pictures etc. in a multi user and multi domain environment comprising a plurality of physically distributed sub-domains having different rendering units, such as loudspeakers, television screens etc. The user is enabled to "grab" an ongoing information rendering experience, such as listening to a piece of music or to a broadcasted radio channel, watching a film or a broadcasted television programme, move to another sub-domain and "throw" the experience onto that sub-domain, where the experience will continue without the need to further operate the rendering units in the selected sub-domain.

20 Claims, 5 Drawing Sheets

OTHER PUBLICATIONS

Atushi Sugiura et al. "A User Interface Using Fingerprint Recognition Holding Commands and Data Objects on Fingers". C&C Media Research Laboratories, NEC Corporation. pp. 71-79. 1998.

Jun Rekimmoto. "Pick-and-Drop: A Direct Manipulation Technique for Multiple Computer Environments". Sony Computer Science Laboratory Inc. pp. 31-39. 1997.

* cited by examiner

PERVASIVE MEDIA INFORMATION RETRIEVAL SYSTEM

TECHNICAL FIELD

The present invention relates to an information retrieval system, in particular a pervasive system in consumer electronics and home entertainment for retrieval of audio and visual information but also information containing text, pictures etc., having means for user operation of the system to improve the user convenience. The present invention is especially directed to be applied in a multi user and multi domain environment.

BACKGROUND OF THE INVENTION

The huge amount of information sources that are available for daily use, e.g. Internet providers of news, music, movies, pictures and goods of any kind, ordinary DVDs and CDs, media broadcasts, telecommunication information just to a mention a few, raises a strong demand for intelligent and simple-to-use equipment and methods to support effectively a user friendly access to the target information.

It is the object of the present invention to provide a system having features and technologies that improve the user-friendliness of information retrieval systems.

SUMMARY OF THE INVENTION

The object is achieved with the present information retrieval system, which comprises at least one data communication network communicating with at least two sub-domains, being physically distributed spaces,
- a plurality of units of information accessible via said data communication network,
- each sub-domain comprising one or more rendering units, e.g. loudspeakers, television screens, etc. for outputting said units of information to a user,
- at least one user activated unit by means of which a user defined pointer relating to a sub-domain may be established by a user, an action which herein is referred to as a "grab",
- the system further comprising at least one sub-domain selector for establishment under control by said user of an association between at least one selected sub-domain and said user defined pointer for subsequent rendering in said selected sub-domain of the units of information being rendered in the sub-domain related to the user defined pointer at the time of the establishment of said user defined pointer, an action which herein is referred to as a "throw" following the abovementioned "grab".

Thus, the present invention relates to an information rendering system, with several different rendering units, such as loudspeakers, television screens or other screens for displaying text, still pictures, moving pictures etc. which are arranged in groups in physically distributed spaces, referred to as sub-domains, where a user is enabled to "grab" an ongoing information rendering experience, such as listening to a piece of music or to a broadcasted radio channel, watching a film or a broadcasted television programme, optionally with certain ambience settings, such as volume level of the rendering, light intensity of the illumination means within the sub-domain etc., move to another sub-domain and "throw" the experience onto that sub-domain, where the experience will continue without the need to further operate the rendering units in the selected sub-domain. The grabbed experience is thrown to one or optionally more selected sub-domains by one user, while other users of the system may use other sub-domains of the system for rendering of other units of information, and the present system is thus suited for a multi-user and multi-sub-domain environment.

The one or more data communication networks may include control means, such as one or more computer means, for controlling the overall operation of the system, but the control means of the system may also be distributed in the various sub-domains and/or the rendering units of the system. The data communication network may further be connected to a storage structure of the system, wherein units of information are stored in said storage structure and may be retrieved there from.

The data communication networks may be by wire or wireless and of the type commonly known today in the art, and may include well-known user access control. The networks may include proprietary or private networks, which optionally may co-function with public data communication network, e.g. to provide data communication connection between sub-domains of the system being arranged with large physical distances, as an example could a moving vehicle constitute one or more sub-domains of the system and the data communication between the vehicle and a non-moving part, such as the user's home comprising other sub-domains of the system could be provided by means of a wireless public data communication network.

The sub-domains of the system are physically distributed spaces comprising each at least one rendering unit but in preferred cases, most of the sub-domains have at least one audio rendering unit and further comprises video rendering units, such as television sets, and may also comprise control of other ambience settings, i.e. of the illumination means of the sub-domain, control of air conditioning and/or air temperature of the sub-domain, control the operation of curtains or shades at the windows of the sub-domain, etc. Sub-domains may e.g. be different rooms within a house or even different areas within one room, a vehicle, e.g. a car, may be one sub-domain or be separated in two or three sub-domains, as long as the rendering of units of information to a user or users within one sub-domain may be made without significantly affecting the other users' experience when rendering units of information in other sub-domains of the system. Thus, the sub-domains are substantially separated with respect to users' ability to perceive the rendering of different units of information in different sub-domains.

The system provides access to units of information to be rendered by the rendering units of the sub-domains, and the units of information may at least comprise audio information, such as music and background sound and in particular embodiments of the invention also streamed data, i.e. radio broadcast or other "live" transmission, where the unit of information is received concurrently with the rendering thereof.

In a preferred embodiment, the at least two of said sub-domains of the system further comprises visual rendering units for outputting said units of information to a user, and the units of information may in that case further comprise visual information including moving picture with sound track, still picture, text files, streamed data as discussed above, etc.

The user defined pointer may in a particular embodiment of the present invention refer to one or more units of information which are currently rendered by the rendering units of a specified sub-domain, when the user defined pointer is established by means of one or more user activated units of the system, the so-called "grab". The user activated units may be portable units which by activation, e.g. the pressing of a button on the unit may activate the establishment of a user defined pointer, which is then stored by the system, e.g. in the portable unit or alternatively e.g. in a control unit of the system, for later "throwing" to a sub-domain of the system. Portable user activated units may be a personal item of the user and be applied for user-identification by the system. A portable user activated unit may in a particular embodiment of the present invention constitute an integrated unit with a sub-domain selector. A portable user activated unit wherein the pointer is stored may optionally be used to transfer a user defined pointer to a sub-domain of another system, where the user is allowed to have access to the system, where after a throw of the pointer to that sub-domain may be performed.

Alternatively, the user activated unit may be installed in one or more of the sub-domains, preferably in all of the sub-domains, and be activated by the users by means of e.g. manual operation or non-contact operation, such as voice-activated user activated units.

The sub-domain selector may be provided similarly, i.e. as a portable unit, preferably integrated with the user activated unit, or as a unit installed in the sub-domains.

The system may in an embodiment include a users position detection device, where the movement of a given user from one sub-domain to another is detected, which may be used to automatically let a grabbed experience follow a user between sub-domains, so that e.g. the setting of the rendering units to present the news from the preferred television channel will follow a user all due the morning from the bedroom to the bathroom, the kitchen and finally to the car, where only the audio-related part of the unit of information, i.e. the sound of the news can be rendered.

A user defined pointer is established by the "grab" of an ongoing user experience at a sub-domain and may in particular comprise a reference to the unit or units of information being rendered at the rendering units of the sub-domain. The grabbed experience may later be thrown to a selected sub-domain of the system so that the experience is resumed in that sub-domain, the "grab and throw" constitutes in other words a spatial and/or temporal transfer of a user experience of a unit of information. In particular embodiments of the present invention, the grabbed user defined pointer may furthermore be transmitted to another user within the present system or optionally also to users of other similar systems.

The throw may in certain embodiments of the system according to the present invention be made selectively to one sub-domain or to many sub-domains at the same time, such as all sub-domains in the car, a number of neighbouring sub-domains, or to predefined groups of sub-domains, e.g. to all daddy's rooms (nursery, kitchen), the teenage daughter's rooms (bathroom, telephone room) etc.

In a preferred embodiment of the present invention, the user defined pointer further comprises concurrent ambience settings of said sub-domain, and the ambience settings of the selected sub-domain concurrent with the rendering of said units of information in the selected sub-domain correspond to the ambience settings of the user defined pointer. In one embodiment of the system with this feature, the ambience setting includes the audio rendering settings, such as the volume, tone settings etc. and in a particular embodiment of the present invention solely consist of said audio rendering settings. However, the ambience settings may alternatively or additionally include the light intensity of the illumination means within the sub-domain, air conditioning and/or air temperature of the sub-domain, operation of curtains or shades at the windows of the sub-domain, etc. As the various sub-domains of the system according to the invention do not necessarily contain the same type and amount of equipment of which the settings are included in the ambience settings of the user defined pointer, it is preferred that the system further comprises means for transferring the ambience settings of the user defined pointer to actual ambience settings of the selected sub-domain, whereby the actual user experience in the sub-domain where the grab was performed and the user experience in the sub-domain the pointer is thrown to may be made correspond as far as possible.

In a further preferred embodiment of the present invention, the user defined pointer further may comprise synchronization data concerning the concurrent temporal rendering position of said unit of information referred to by the user defined pointer, so that the rendering of the unit of information may be resumed at the selected sub-domain at a temporal rendering position of the unit of information corresponding to the temporal rending position of said unit of information at the time of the establishment of the user defined pointer. By means of the synchronization data, it is possible to grab e.g. a movie or a concert recording during rendering of it and resume the experience at a later stage and/or at a different sub-domain from the temporal position in the unit of information, i.e. at the scene in the movie or the movement of the concert that was experienced by the user when the grab was made.

The system may furthermore comprise access control means for controlling the access of at least two users to the system, the access control means being adapted to receive unique identification data from a user and based thereon selectively allow the user to have access to at least parts of the system, such as having access to establish a user defined pointer relating to a specific sub-domain, i.e. to make a grab at a particular sub-domain, in which the access control means have specifically allowed the specific user to perform the grab. The access control means may alternatively or additionally selectively allow the rending of specific units of information in a sub-domain selected by said user, e.g. by the performance of a throw, so that the user will be permitted to have access to particular units of information and may be prevented from having access to other units of information in the system. Furthermore, the access control means may as an alternative or in combination with the aforementioned options selectively allow the rending of units of information in a specific sub-domain, e.g. by the performance of a throw, so that the specific user is allowed by the access control means to initiate the rendering of units of information in a particular sub-domain.

In particular, the access control means may comprise for at least some of the sub-domains of the system a defined hierarchy of users, the access control system being adapted to allow said rendering only in case said sub-domain is not in use for rendering units of information by another user having a superior hierarchy position. Thereby, a situation of "competing throws" may be avoided, where different users of the system try to throw each their preferred experience on the same sub-domain.

The system may be operated as a stand-alone system with a storage device comprising all the units of information. However, it is preferred that the data communication network comprises a data communication connection to a public data communication network by means of which a plurality of units of information are accessible, wherein at least some of said units of information are provided as data streams, i.e. i.e. radio broadcast, television broadcasts or other "live" transmission, where the unit of information is received concurrently with the rendering thereof.

It is furthermore preferred that the accessible units of information have metadata associated therewith, said metadata being accessible via said data communication network, the metadata relating to and describing the content of the unit of information according to pre-defined criteria. Thereby, searches in the units of information are facilitated, including searches for units of information that fulfill a certain set of criteria, such as those with a content that resembles preferred units of information.

In order to further improve the user-friendliness of the information retrieval systems, a particular embodiment of the present invention is provided, wherein at least one of the sub-domains further comprises means for presenting one or more selectable content suggestions to a user, each content suggestion representing at least one of said units of information, the system further comprising content suggestion control means for generating said one or more content suggestions to each separate user from stored data relating to each user of the system.

In a preferred embodiment of the present invention, the content suggestion control means comprises means for collecting and storing user behaviour data relating to rendering of units of information within the system, said user behaviour data including associated information identifying at least the user, the unit of information and the sub-domain of the system at which the units of information was rendered, and the content suggestion control means further comprises means for evaluating said stored user behaviour data and provide content suggestions based on said evaluation. Thus, inspiration for the selection of units of information may be calculated for the individual user based not only on the user's prior behaviour with respect to use of units of information, but also on the location, the sub-domain, where the prior behaviour took place. The content suggestion for a users in a given situation may therefore be dependent on the sub-domain the users is in, because the suggestions will be provided with reference to the usual behaviour of the user when situated in that sub-domain of the system.

In a further preferred embodiment, the user behaviour data further includes the time and date of the rendering of the units of information, which again may be used to tailor the content suggestions to the particular situation of the user. The time and date may be divided into certain groups, such as weekends, evenings, holidays etc.

Also, the user behaviour data may further includes the temporal duration of the rendering of the units of information and/or the ambience settings of said sub-domain.

BRIEF DESCRIPTION OF THE FIGURES

An embodiment of the present invention is illustrated with the enclosed figures of which

DETAILED DESCRIPTION OF EMBODIMENTS OF THE INVENTION

Figure 1:
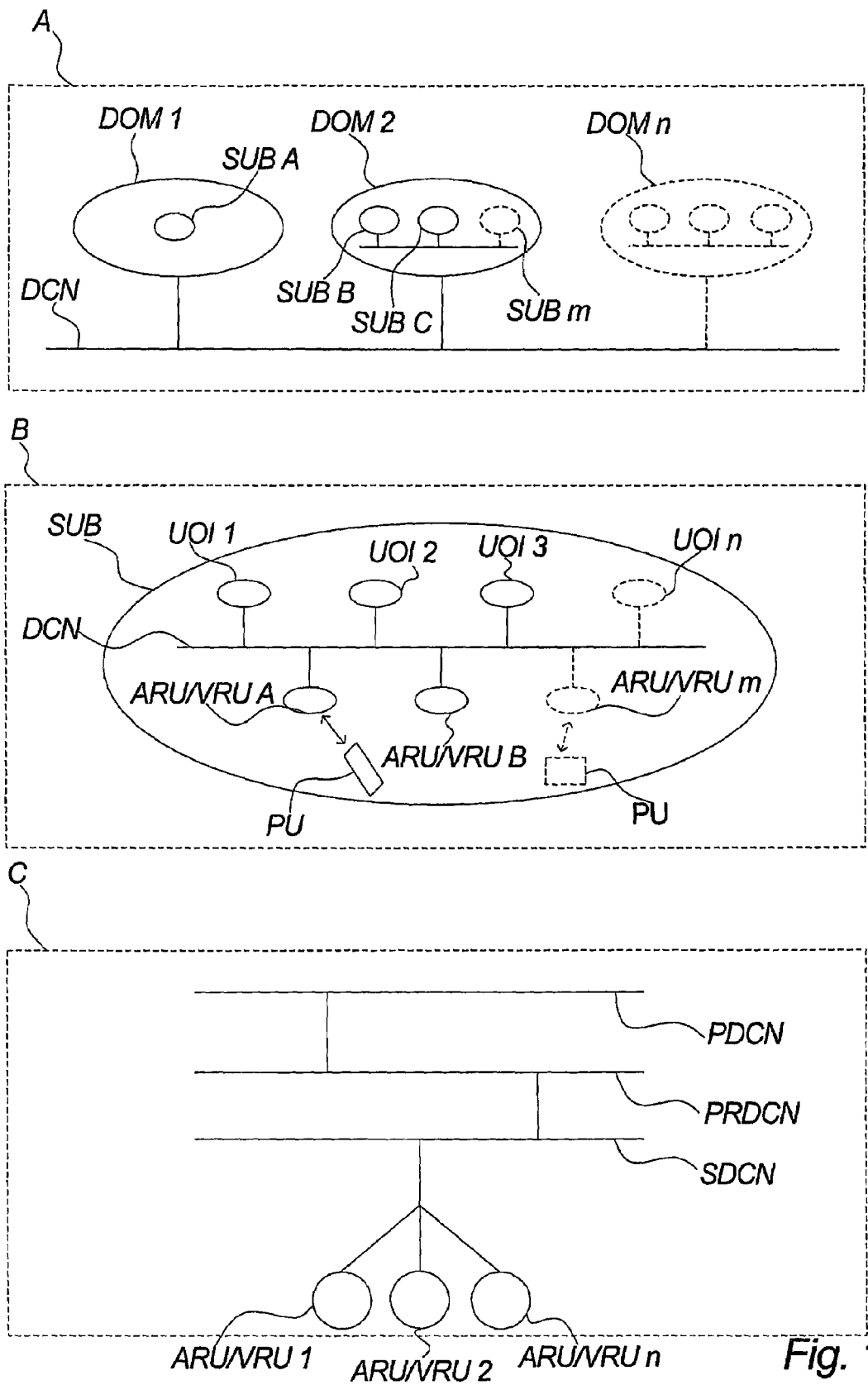
FIG. 1 shows three views (A, B and C) of the system lay-out.

The layout of a system according to the present invention is shown in FIGS. 1A to 1C. The system comprises a plurality if sub-domains SUB A, SUB B, SUB C, . . . SUB m, and the users U may experience the rendering of different units of information UOI 1, UOI 2, UOI 3 in these sub-domains, which are arranged or grouped in domains DOM 1, DOM 2 each comprising one or more sub-domains.

Each sub-domain is a physically separate entity comprising equipment for rendering of the units of information, e.g. television sets (visual rendering units VRA A, VRA B etc.), loudspeakers (audio rendering units ARU A, ARU B etc.) etc. Examples of domains are a house, with several sub-domains e.g.: kitchen, living room, dining room and bedrooms, a car possibly divided into more sub-domains, e.g. the front seats and the back seats, an office building, with several sub-domains e.g.: individual offices, meeting rooms and conference rooms, and a hotel building with several sub-domains e.g.: individual guest rooms, meeting rooms and conference rooms.

The sub-domains are interconnected via a wired- or wireless data communication network DCN, by means of which the units of information UOI 1, UOI 2, UOI 3 etc. are made accessible to the users in the sub-domains. The data communication network DCN may as illustrated in FIG. 1C comprises various parts and layers, here shown as a sub-domain data communication network SDCN to which the rendering units (ARU/VRU 1, ARU/VRU 2 etc.) of the given sub-domain are connected. The SDCN is connected together with the corresponding data communication networks of the other sub-domains within the system to a private data communication network PRDCN pertaining to the system, which again may be connected to one or more public data communication networks PDCN, including wireless broadcast of radio and television, but also including communication of data via a connection to the Internet, such as text, pictures, voice-over-Internet Protocol, etc. and public telephone network, including wireless mobile telephone networks, such as speech, images text messages etc. Units of information UOI may be stored at and retrieved from all parts of the data communication network.

The units of information UOI may be stored on local data storage units pertaining to the system, on remote data storage units pertaining to the system or being shared with e.g. other systems, or a combinations thereof, furthermore combined with public data sources, such as television and radio broadcast. The system is a pervasive information retrieval system, by which is understood that all sources of information and units of information are accessible based on the same terms, whether the sources are local, distributed or global relative to the user. All sources may be connected to all destination targets based on the same access terms and according to the capability of one actual destination unit, and all sources and destination units may be operated via miscellaneous user input devices according to the capability of one actual source and destination unit. Generally all sources and all destinations are accessible with the same features. A connection might be established among arbitrary sources and destinations regardless of the physical location of those, i.e. they might be located on the PDCN, the PRDCN or the SDCN.

The system further comprises a layered pervasive access control component to control the establishment of the connection of the source of units of information to the rendering units ARU, VRU in the sub-domains. The user is validated and accepted to operate one, a plurality of or all sub-domains of the system with their rendering units, e.g. by means of a manual login procedure (entry of user ID and password), by Person Identification means, e.g. sense of unique fingerprints, by a wireless remote control input device which along the transmission of command codes issues identification ID of the user, or automated person sensing means identifying that the user enters a domain or sub-domain. After passing the above validation procedure the user is accepted to operate the sub-domain rendering units, and gets access and might connect to and operate a unit of information source with respect to defined access rights to the source (e.g. the particular user is allowed to Read, Write, Edit, Control, Delete etc. for each particular unit of information UOI).

Figure 2:
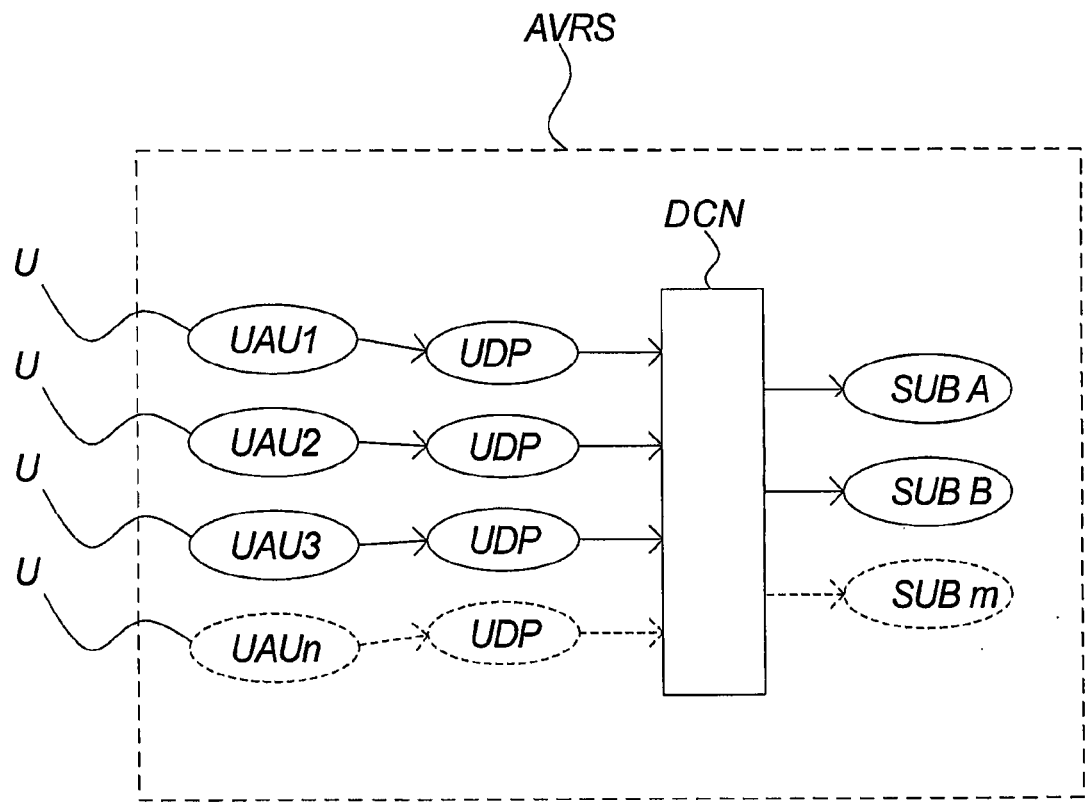
FIG. 2 illustrates the user of the system with grab and throw.

A particular use of operating the system, referred to as "grab and throw" is discussed in detail in the following with reference to FIG. 2. When the user U has been allowed access to using the system, which mainly is used as an audio and visual retrieval system, the user may activate a user activated unit UAU 1, UAU 2, etc., such as a portable unit PU in order to establish a user defined pointer UDP referring to a sub-domain in which a unit of information UOI is currently rendered, an action referred to as a "grab" For the user it appears as if this unit PU is the carrier of the experience. The pointer UDP refers the unit of information UOI currently being rendered, to the ambience settings of the sub-domain, e.g. the volume and sound control settings, setting of the illumination means of the sub-domain etc. and to the temporal rendering position of the unit of information UOI, so that the rendering of that particular unit of information UOI may be resumed in this sub-domain or in another sub-domain of the system at the selection of the user U, where the rendering may if relevant and required be resumed at the same temporal rendering position of the unit of information UOI with the same ambience settings etc. However, the equipment of the various sub-domains of the system are normally not identical, and the rendering of the unit of information UOI is adapted to the equipment of the selected sub-domain and the ambience settings referred to by the pointer UDP are transferred to actual ambience setting of the selected sub-domain, so that the user U will have an experience of the rendering corresponding to the experience in the sub-domain at the establishment of the user defined pointer UDP, i.e. at the grab. This selection of sub-domain and resuming of rendering is referred to as a "throw".

Figure 3:
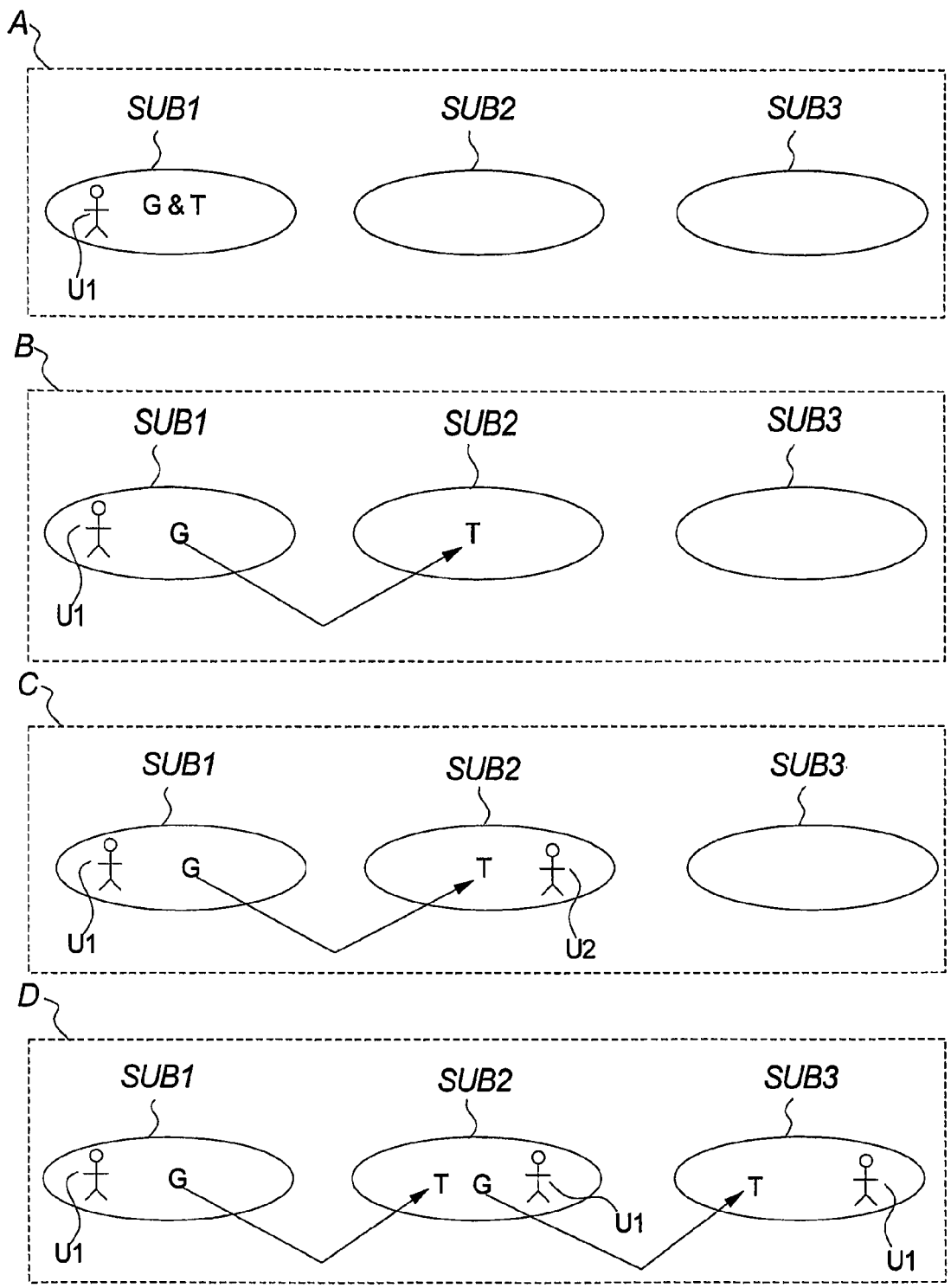
FIG. 3 shows three examples (A, B, and C) of different uses of grab and throw.

There are many different types of grab and throw G & T in multi-sub-domain configurations of a system. In one embodiment illustrated in FIG. 3 A to D, a user U1 is located in one room, i.e. in a sub-domain SUB1, where he may grab G the rendering experience in one sub-domain SUB1 and throw T it later in the same sub-domain SUB1, see FIG. 3 A or alternatively to a second sub-domain SUB2 in which he is not present, see FIG. 3B. The throw T may be made to a sub-domain SUB2 in which a second user U2 is present and is operating the rendering units of the sub-domain SUB2. The user access control component of the system comprises a hierarchical structure of the users U1, U2 with respect to the various sub-domains SUB1, SUB2, SUB3 and may allow the throw T in case the throwing user U1 with respect to the selected sub-domain SUB2 is ranking above the user U2 currently using the sub-domain SUB2. In case the two users U1, U2 are at the same level or the second user U2 is ranking higher than the first user U1, the attempted throw T is not allowed by the system. Alternatively, the grab G and throw T may be made as a "follow me" function as depicted in FIG. 3 D, where the user U1 moves between sub-domains SUB1, SUB2, SUB3 and the grab G and throw T is made concurrently so that the experience follows the user U1. The follow-me experience can be manually or automatically executed with sensor means detecting the change of location of the user between the sub-domains.

The throw may, depending on the equipment of the sub-domains in which the grab and the throw are made, be a full, a partial or an enhanced throw. A full throw may be made if it is possible to get the full experience back by a throw, e.g. a throw made in the same sub-domain as the grab. A partial throw is made in a sub-domain, where it is not possible to regain the full experience E.g. an audio-video experience is grabbed and thrown on an audio-only sub-domain. An enhanced throw is made when the experience thrown by the user ends up as an "enlarged" experience than the grabbed one. E.g. a mobile phone audio-experience is grabbed and thrown onto a loudspeaker.

A number of options are available when using grab and throw:

The grab may be a copy when an experience is grabbed from one sub-domain and thrown to another sub-domain without removing the experience from the first sub-domain. E.g. the user is watching the newest photos of the children from his/her collection, grabs a photo of each child and throws them to the small photo-screen-frames on the wall. Another example is that the user is watching a news broadcast and wants to walk between two rooms. The user grabs the broadcast, walks to another room and throws it to the television set in this room. Optionally, the time might be "stopped" between grab and throw so the user does not loose any part of the experience; user defined pointer UDP contained synchronization data that were applied at the throw.

A grab may be a move of experience when an experience is grabbed from one sub-domain and thrown to another sub-domain and the experience is removed from the first sub-domain.

As an example the users are watching a movie using the visual screen and all the loudspeakers. An announcement of an e-mail appears in a corner of a display in the room. The user grabs the announcement and throws it to the nearest speaker or to the mobile phone. The e-mail then is read out for the user. If a speaker was used, then afterwards it rejoins the other ones playing the film. Another example of move is that the users are watching television, the speaker mentions a web-page which is connected to the subject of the broadcast and the name of the web-page is written in the corner of the screen. The user grabs this web-page-name and throws it to another screen in the room.

The grab and throw may constitute a pause when an experience is grabbed from one room and stored, and then it is thrown to the room again perhaps several days later.

A grab may constitute a bookmark when an experience is grabbed and the source of the unit of information, e.g. the television broadcast channel number, the text page or the web-page is stored. When the bookmark is thrown, the rendering units of the selected sub-domain will render the same source of the unit of information rendered when the bookmark was made but with the current streamed data, e.g. a broadcasted television programme. In one example, the user is watching television and a web-browser on the big screen to the right of the television screen and a photo-slideshow on the small screen to the left of the television screen. The user then grabs the experience and presses standby/off. Several days later the user selects "bookmark" and the same experience resumes. The stored content starts from the position where it was left and the live content starts on the same TV-channel, the same web-page and so on, but perhaps with a different content.

A grab may start a recording when an experience is grabbed from one sub-domain room and is set on "recording" which selects a default recorder in the network, where the data stream, typically a broadcasted television or radio programme is stored for later rendering started with a throw of the recorded experience.

An experience may be send to another user of the system and optionally to users of other systems. With send, an experience is grabbed and send to another user, e.g. to the children room or to a friend outside the system; and/or when an experience is grabbed and send to a portable device. An example of send is: While watching a photo-slideshow the user selects photos and adds them to a play-list. When this is done the user grabs the play-list and sends it to a member of the family, this is done e.g. using the internet. Another example of send: While listening to music the user wants to share the experience with his friend. The user grabs the music and throws it to his friend. As soon as this is done the music or a unique identification of the music is streamed via the internet to the friend of the user.

A grab may be made by the user in one system and used in another corresponding system where the user has access rights, so that a grab made at home may be thrown in the system at the user's work or in the car, in case it is not a continuously part of the home system.

A grab is a universal grab and covers all the different throw-possibilities.

The user activated unit UAU may be a two-way pointing device. By pointing the unit UAU at a rendering unit in the system a status informs the user what will be grabbed. The information of what is to be grabbed (if the grab is performed) is send to the pointing device and displayed there in some form, depending on the device. When the user points at another network product, then information from this product, content and ambience is displayed on the device. In that way the user can select where to grab from. Then the user can make a grab. A status informs the user what has been grabbed. E.g.: "TV new grabbed", "room content grabbed", "movie grabbed", "photo grabbed", "e-mail announcement grabbed" or "web reference grabbed".

Alternatively, the user activated unit UAU may be a one way pointing device without a grab-status on the pointing device. By pointing the unit UAU at a rendering unit of the system and pressing the grab-button the user can make a grab. No information is send to the user activated unit UAU, but it sends data about the grab to the system. A status of what is grabbed may be provided to the user on another display in the sub-domain.

As a further alternative, the user activated device may be a storage device which grabs the content, i.e. the rendered unit of information and not only a pointer to it. After pressing the grab button the user then can press the play button to make a throw.

The user activated unit UAU may thus be the carrier of the experience, i.e. the user defined pointer UDP. It is not necessarily the carrier of units of information and ambience settings but may be a carrier of a pointer to the content and ambience, it may be the carrier of an unambiguously (fingerprint) description of content (units of information) and ambience settings, or it may be the carrier of its own unambiguous device-code.

The present system further comprises a content suggestion control arrangement to assist the users in choosing from the amount of units of information available. The content suggestion control arrangement may present the user with an inspiration-list established by elements of the following list:

1. Actual mate experience. This refers to the experience that a friend or a family member located elsewhere is experiencing right now. If the other person is located in another location, the system is retrieving this information via a web service on the internet, and if the other person is located in the same location as the user, the information is retrieved via a local network.
2. Context based suggestions. This refers to a list based on collected user behaviour data, including the time and sub-domain of rendering of particular units of information and suggests contents (units of information UOI) based on experiences made close to the user's present actual situation.
3. Similar to Context based suggestions. This refers to a list with experiences that resemble the experiences mentioned in paragraph 2 and is based on the well-known more-of-the-same calculations.
4. Life Sculpture—suggestions. This refers to a list of experiences that the "Life-Sculpture" module suggestions to the user, on the basis of the information the user has given about in what direction he wants his use-pattern to move and at the same time paying attention to the actual use-pattern of the user. Examples of Life Sculpture suggestions: "A given genre must be made a priority over every other". "A given artist must be made a priority over every other". "A given media genre must be made a priority over every other". "I don't want this, I want something else—I don't know what". "I would like to be inspired". "I don't want to be inspired". "A given time interval must be made a priority over every other".
5. The last experience which has been rendered in the sub-domain. This refers to the experience that previously has been rendered in the sub-domain, or the experience that the user previously has had in the sub-domain.
6. Last recording made with the grab function.
7. Absolutely not similar to Context based suggestions. This refers to the generation of a list of experiences that absolutely not assembles any of the experiences mentioned in paragraph 2.

Which elements from above-mentioned suggestion lists that is extracted and used in an Inspire list presented to the user is determined by the following:

A. Similar to Context based media genre suggestions. The "user-behaviour-context space" can determine which media genre that is closest to the actual situation of the user. If this media genre is an audio-visual experience, the system will make audio-visual experiences a priority over everything else. If "Life Sculpture" tells that the user desires to change this, the "Life Sculpture" media genre will of course override.

B. Similar to Context based activity suggestions. The "user-behaviour-context space" can determine which activity that is closest to the actual situation of the user. If this activity is "Play" the system will generate an Inspire list that mainly contains play-suggestions. If the activity is "communication", the Inspire list will contain at least one communication suggestion. Calculations in the "user-behaviour-context space" can determine who this person might want to communicate with at this time. If the activity is "Grab and Throw", the Inspire list might contain a G & T suggestion (or a Grab suggestion). If "Life Sculpture" tells that the user desires to change this, the "Life Sculpture" activity genre will of course override. Life sculpture can remove something from the Inspire list and/or add something new.

The Inspire list is dynamic and changes all the time to adapt to any new situation. An operation from the user, or just the fact that the time goes by, can trigger that the list is changing. When the user is browsing his music collection, photo collection, film collection, etc. the list is changing. The more the user by his choices restrains the possibilities in the navigation e.g. in his music collection the more filtered the Inspire list will be. If there in the behaviour of the user "user-behaviour-context space" or in the life sculpture of the user is something dominating from another media genre, this will also be displayed in the Inspire list. For instance if the user listens to music and browses his music collection, a TV program might appear in the Inspire list. When a user selects an experience the list will change to adapt to this new situation. When an element in the Inspire list is marked e.g. by moving a mouse cursor over it, metadata may be displayed for the actual element. This metadata tell the user why this element is included in the Inspire list with phrases like "similar to . . . ", "often used", "found in EPG and similar to . . . ", "just recorded" etc.

It is possible to make a "Grab" from the Inspire list. This will involve the Inspire list to change. Subsequently the Inspire list will give inspiration for different "Throw" possibilities. I.e. the Inspire list will inspire the user to make specific "Throws", when the user has made a "Grab".

The system according to the present embodiment comprises a content suggestion control arrangement having an element for the collection and analysis of user behaviour data for providing suggestions to the user of the system of content, i.e. units of information UOI to be rendered by the user in sub-domains of the system. The present element for the collection and analysis of user behaviour data is unique in that it collects and analyses data not only concerning the contents, i.e. units of information, accessed and used for rendering by the specific user, but also including the context of rendering, i.e. the sub-domain among a plurality of sub-domains in the system in which the user had the experience with the contents. Thus, the content suggestion control arrangement may suggest content to the user based among other factors also on the context in which the user require suggestions for content UOI. A simple example is a user who usually listens to a specific radio broadcasted channel in the kitchen, which is a sub-domain of the system. When the user asks for a list of suggestion of contents in this sub-domain, the system will have the particular radio channel on the list. Furthermore, the user behaviour data comprises the time of the day of rendering of the units of information UOI, including information of the date, from which data relating to the type of day, i.e. working day, holiday, weekend, season of the year etc. may be deduced so that these factors may be included in the analyses leading to the suggestion of content to the user. A plurality of other data may be included in the user behaviour data, such as ambience settings, including light settings of the sub-domain, the duration of the rendering of the units of information, other users present in the sub-domain, user settings of the rendering equipment etc.

For enhancing the ability of the content suggestion control arrangement to analyse the collected data and calculate suitable suggestions, it is an advantage that metadata relating to the content of the units of information are stored in data storage means accessible by the system, whereby not only units of information previously rendered by the user in question may be suggested to a user but also units of information related to or diverting in specified directions from previously rendered units of information UOI.

Figure 4:
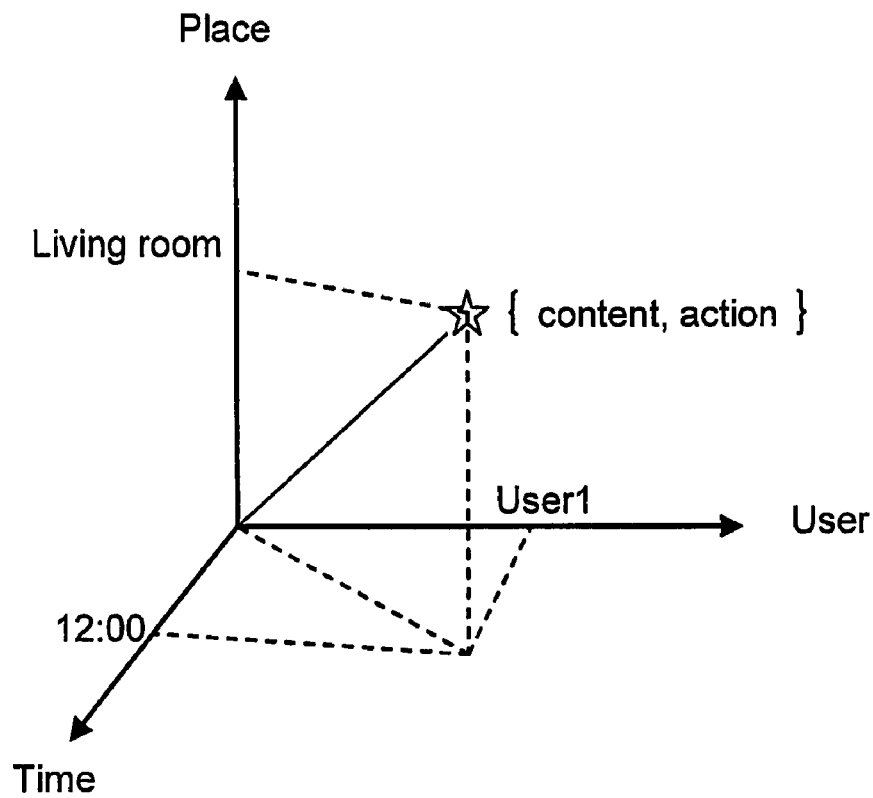
FIG. 4 illustrates the principle of using the user behaviour data.

All these collected user data may be stored in a multi-dimensional space where each axis represents one of the types of data, i.e. the time of rendering, the sub-domain etc. as illustrated with a three-dimensional space in FIG. 4. The weight of a given set of data for a particular user experience of a unit of information on the provision of suggestions of contents to a user may be dependent on the distance between the set of data and the occasion in which the suggestions are requested, i.e. the time and date, the sub-domain etc. so that experiences closer in time are weighted higher than more distant experiences, etc. A number of parameters defining the weight of various data in a collected set of data may be user-defined.

The element for the collection and analysis of user behaviour data collects and stores data continuously and the user may e.g. choose to request suggestions based on another occasion than the present, i.e. suggestions based on a date several years ago, on summer vacation although the actual season is winter etc., and collected user behaviour data may be exchanged between users of the system and of similar systems.

Figure 5:
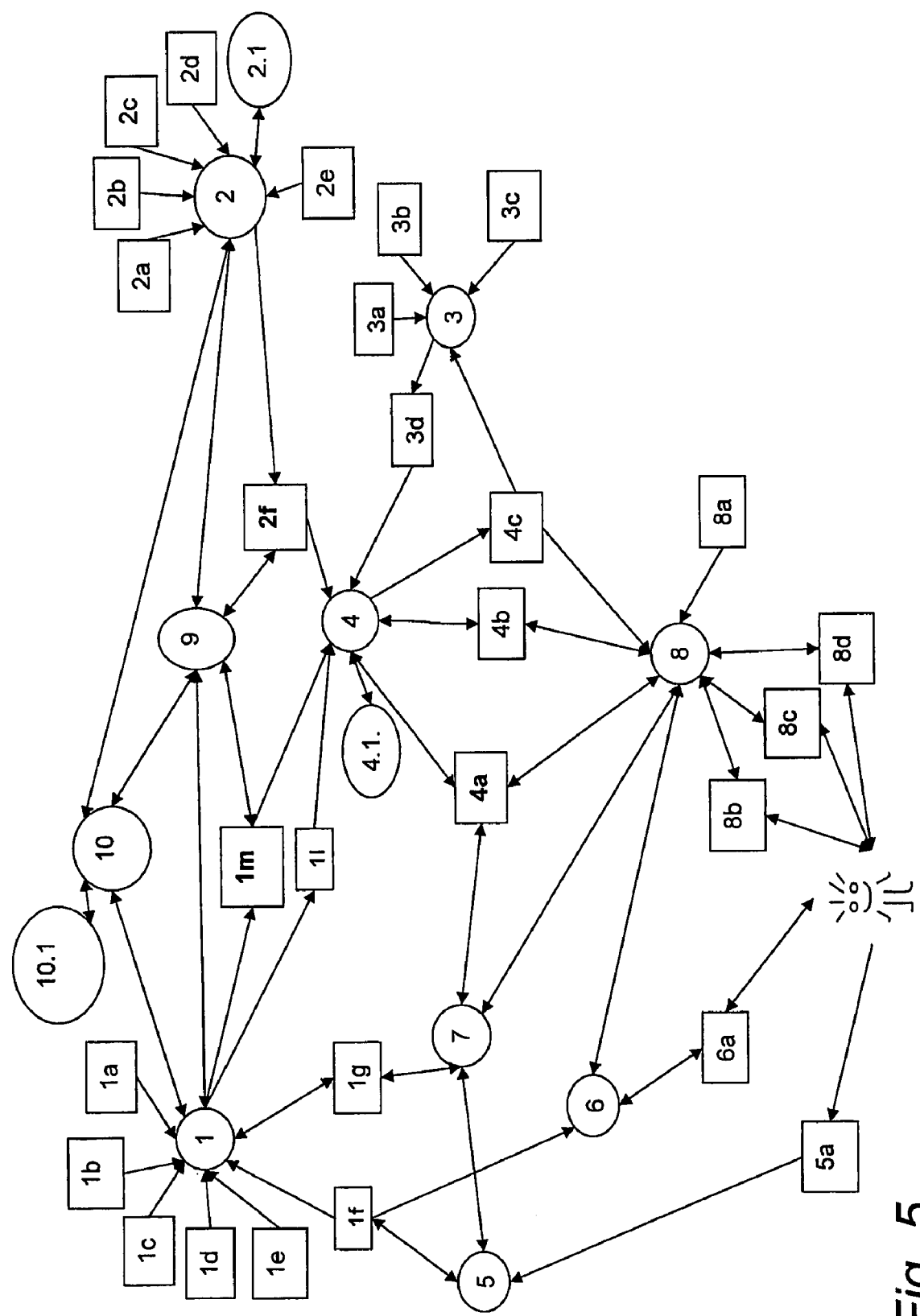
FIG. 5 shows the structure of the content suggestion control means of the system.

An example of the architecture of a content suggestion control arrangement according to the present invention is shown in FIG. 5, where:

1. Is the collection of user behaviour.
1*a*. is the place, i.e. the sub-domain.
1*b*. is the time (year, date time, working day or holiday).
1*c*. is the actual user operation of the rendering units.
1*d*. presence of users in the sub-domain
1*e*. type of situation: "lean back", "lean forward", "moving around close" or "moving around distant"
1*f*. User identifier and state of mind
1*g*. Unit of information being rendered in the sub-domain, selection of units of information by the user and ambience settings
1*l*. The actual context
1*m*. Context-database. Collected user behaviour data
2. Collecting Life-Sculpture
2*a*. The user's profile: age, sex, education, interests etc.
2*b*. The user's requirements: e.g. a whish to experience a given artist, genre etc.
2*c*. User's whish to be surprised
2*d*. User's whish to be inspired
2*e*. User's whish to change habits
2*f*. Life-Sculpture—database. Collected Life-Sculpture data.
2.1 Communication with the user
3. Collection of inspiration and surprise contents
3*a*. Other user's behaviour data
3*b*. Search for content
3*c*. Search for alternatives to content
3*d*. Collected inspiration and surprise content suited for the profile of the actual user
4. Handling and interpretation of 1. Collected user behaviour data, 2. Life Sculpture data and 3. Collection of inspiration and surprise contents
4.1. MOTS (More Of The Same) calculations
4*a*. Content-database.
4*b*. Communication between the system and the content suggestion control arrangement
4*c*. Model profile from e.g. a friend or another person.
5. User-recognition Face and voice-recognition Speech-recognition. User-Mood recognition
5*a*. Biometric measurements of the user
6. Communication with the user, recognition of user's behaviour and qualified guessing of the user's requirements to experience
6*a*. User query
7. Content-recognition. How to find something similar? Content-Mood-recognition. Ambience recognition
8. The system applies the profile, the collected inspiration and surprise contents, the possible biometric measurements and the present system functions to suggest a personal tailored experience to the user.
8*a*. System functions controlling the operation of the content suggestion control arrangement.
8*b*. Grab & Throw as experienced by the user when implemented in the content suggestion control arrangement.
8*c*. The Inspire-list alone or combined with a Content Navigator system
8*d*. Content Navigator constructed and arranged in accordance with the user behaviour as experienced by the user when implemented in the content suggestion control arrangement.

9. Initializing and configuration of collected user behaviour and Life Sculpture
10. Communication with other products
10.1 Proprietary middleware between equipment of the system

The invention claimed is:

1. An information retrieval system comprising:
a computer;
at least one data communication network communicating with at least two sub-domains, being physically distributed spaces;
a plurality of units of information accessible via said data communication network;
each sub-domain comprising one or more rendering units for outputting said units of information to a user;
at least one user activated unit by means of which a user defined pointer relating to a sub-domain is established by a user;
at least one sub-domain selector for establishment under control by said user of an association between at least one selected sub-domain and said user defined pointer for subsequent rendering in said selected sub-domain of the units of information being rendered in the sub-domain related to the user defined pointer at the time of the establishment of said user defined pointer and
an access control means for controlling the access of at least two users to the system, the access control means being adapted to receive unique identification data from a user and based thereon selectively allow the user to have access to at least parts of the system, wherein
the access control means selectively allows the rendering of units of information in a specific sub-domain,
the access control means further comprises, for at least some of the sub-domains of the system, a defined hierarchy of users, the access control system being adapted to allow said rendering only in case said sub-domain is not in use for rendering units of information by another user having a superior hierarchy position, and
said user defined pointer further comprises concurrent ambience settings of said sub-domain, and wherein the ambience settings of the selected sub-domain concurrent with the rendering of said units of information in the selected sub-domain correspond to the ambience settings of the user defined pointer.

2. The system according to claim 1, wherein said ambience setting at least includes the light intensity of the illumination means within the sub-domain.

3. An information retrieval system comprising:
a computer;
at least one data communication network communicating with at least two sub-domains, being physically distributed spaces;
a plurality of units of information accessible via said data communication network;
each sub-domain comprising one or more rendering units for outputting said units of information to a user;
at least one user activated unit by means of which a user defined pointer relating to a sub-domain is established by a user;
at least one sub-domain selector for establishment under control by said user of an association between at least one selected sub-domain and said user defined pointer for subsequent rendering in said selected sub-domain of the units of information being rendered in the sub-domain related to the user defined pointer at the time of the establishment of said user defined pointer and
an access control means for controlling the access of at least two users to the system, the access control means being adapted to receive unique identification data from a user and based thereon selectively allow the user to have access to at least parts of the system, wherein
the access control means selectively allows the rendering of units of information in a specific sub-domain,
the access control means further comprises, for at least some of the sub-domains of the system, a defined hierarchy of users, the access control system being adapted to allow said rendering only in case said sub-domain is not in use for rendering units of information by another user having a superior hierarchy position,
at least two of said sub-domains each comprises one or more audio rendering units (ARU) for outputting said units of information to a user, and
said ambience setting at least includes audio rendering settings.

4. An information retrieval system comprising:
a computer;
at least one data communication network communicating with at least two sub-domains, being physically distributed spaces;
a plurality of units of information accessible via said data communication network;
each sub-domain comprising one or more rendering units for outputting said units of information to a user;
at least one user activated unit by means of which a user defined pointer relating to a sub-domain is established by a user;
at least one sub-domain selector for establishment under control by said user of an association between at least one selected sub-domain and said user defined pointer for subsequent rendering in said selected sub-domain of the units of information being rendered in the sub-domain related to the user defined pointer at the time of the establishment of said user defined pointer;
an access control means for controlling the access of at least two users to the system, the access control means being adapted to receive unique identification data from a user and based thereon selectively allow the user to have access to at least parts of the system; and
a means for transferring ambience settings of the user defined pointer to actual ambience settings of the selected sub-domain,
wherein
the access control means selectively allows the rendering of units of information in a specific sub-domain,
the access control means further comprises, for at least some of the sub-domains of the system, a defined hierarchy of users, the access control system being adapted to allow said rendering only in case said sub-domain is not in use for rendering units of information by another user having a superior hierarchy position,
said user defined pointer refers to at least one of said units of information being rendered in the sub-domain related to the user defined pointer at the time of the establishment of the user defined pointer.

5. An information retrieval system comprising:
a computer;
at least one data communication network communicating with at least two sub-domains, being physically distributed spaces;
a plurality of units of information accessible via said data communication network;
each sub-domain comprising one or more rendering units for outputting said units of information to a user;

at least one user activated unit by means of which a user defined pointer relating to a sub-domain is established by a user;

at least one sub-domain selector for establishment under control by said user of an association between at least one selected sub-domain and said user defined pointer for subsequent rendering in said selected sub-domain of the units of information being rendered in the sub-domain related to the user defined pointer at the time of the establishment of said user defined pointer; and an access control means for controlling the access of at least two users to the system, the access control means being adapted to receive unique identification data from a user and based thereon selectively allow the user to have access to at least parts of the system, wherein the access control means selectively allows the rendering of units of information in a specific sub-domain, the access control means further comprises, for at least some of the sub-domains of the system, a defined hierarchy of users, the access control system being adapted to allow said rendering only in case said sub-domain is not in use for rendering units of information by another user having a superior hierarchy position, and a user defined pointer further comprises synchronization data concerning the concurrent temporal rendering position of said unit of information referred to by the user defined pointer, so that the rendering of the unit of information is resumed at the selected sub-domain at a temporal rendering position of the unit of information corresponding to the temporal rendering position of said unit of information at the time of the establishment of the user defined pointer.

6. An information retrieval system comprising:

a computer;

at least one data communication network communicating with at least two sub-domains, being physically distributed spaces;

a plurality of units of information accessible via said data communication network;

each sub-domain comprising one or more rendering units for outputting said units of information to a user;

at least one user activated unit by means of which a user defined pointer relating to a sub-domain is established by a user;

at least one sub-domain selector for establishment under control by said user of an association between at least one selected sub-domain and said user defined pointer for subsequent rendering in said selected sub-domain of the units of information being rendered in the sub-domain related to the user defined pointer at the time of the establishment of said user defined pointer and an access control means for controlling the access of at least two users to the system, the access control means being adapted to receive unique identification data from a user and based thereon selectively allow the user to have access to at least parts of the system wherein the access control means selectively allows the rendering of units of information in a specific sub-domain, the access control means further comprises, for at least some of the sub-domains of the system, a defined hierarchy of users, the access control system being adapted to allow said rendering only in case said sub-domain is not in use for rendering units of information by another user having a superior hierarchy position, and the data communication network comprises a data communication connection to a public data communication network by means of which a plurality of units of information are accessible, wherein at least some of said units of information are provided as data streams.

7. An information retrieval system comprising:

a computer;

at least one data communication network communicating with at least two sub-domains, being physically distributed spaces;

a plurality of units of information accessible via said data communication network;

each sub-domain comprising one or more rendering units for outputting said units of information to a user;

at least one user activated unit by means of which a user defined pointer relating to a sub-domain is established by a user;

at least one sub-domain selector for establishment under control by said user of an association between at least one selected sub-domain and said user defined pointer for subsequent rendering in said selected sub-domain of the units of information being rendered in the sub-domain related to the user defined pointer at the time of the establishment of said user defined pointer; and an access control means for controlling the access of at least two users to the system, the access control means being adapted to receive unique identification data from a user and based thereon selectively allow the user to have access to at least parts of the system wherein the access control means selectively allows the rendering of units of information in a specific sub-domain, the access control means further comprises, for at least some of the sub-domains of the system, a defined hierarchy of users, the access control system being adapted to allow said rendering only in case said sub-domain is not in use for rendering units of information by another user having a superior hierarchy position, and the accessible units of information have metadata associated therewith, said metadata being accessible via said data communication network the metadata relating to and describing the content of the unit of information according to pre-defined criteria.

8. An information retrieval system comprising:

a computer;

at least one data communication network communication with at least two sub-domains, being physically distributed spaces;

a plurality of units of information (UOI) accessible via said data communication network (DCN);

each sub-domain comprising one or more rendering units (ARU, VRU) for outputting said units of information to a user;

at least one user activated unit by means of which a user defined pointer relating to a sub-domain is established by a user;

at least one sub-domain selector for establishment under control by said user of an association between at least one selected sub-domain and said user defined pointer for subsequent rendering in said selected sub-domain of the units of information being rendered in the sub-domain related to the user defined pointer at the time of the establishment of said user defined pointer; and an access control means for controlling the access of at least two users to the system, the access control means being adapted to receive unique identification data from a user and based thereon selectively allow the user to have access to at least parts of the system, wherein the access control means selectively allows the rendering of units of information in a specific sub-domain, the access control means further comprises, for at least some of the sub domains of the system, a defined hierarchy of users, the access control system being adapted to allow said rendering only in case said sub-domain is not in use for rendering units of information by another user having a superior hierarchy position, and at least one of the sub-domains further comprises means for presenting one or more selectable content suggestions to a user, each content suggestion representing at least one of said units of information, the system further comprising content suggestion control means for generating said one or more content suggestions to each separate user from stored data relating to each user of the system.

9. The system according to claim 8, wherein the content suggestion control means comprises means for collecting and storing user behavior data relating to rendering of units of information within the system, said user behavior data including associated information identifying at least the user, the unit of information and the sub-domain of the system at which the units of information was rendered, and the content suggestion control means further comprises means for evaluating said stored user behavior data and provide content suggestions based on said evaluation.

10. The system according to claim 9, wherein the user behavior data further includes the time and date of the rendering of the units of information.

11. The system according to claim 9, wherein the user behavior data further includes the temporal duration of the rendering of the units of information.

12. The system according to claim 9, wherein the user behavior data further includes ambience settings of said sub-domain.

13. Information retrieval system comprising:
a computer;
at least one data communication network communicating with at least two sub-domains, being physically distributed spaces; a plurality of units of information accessible via said data communication network;
each sub-domain comprising one or more rendering units for outputting said units of information to a user;
at least one user activated unit by means of which a user defined pointer relating to a sub-domain is established by a user;
at least one sub-domain selector for establishment under control by said user of an association between at least one selected sub-domain and said user defined pointer for subsequent rendering in said selected sub-domain of the units of information being rendered in the sub-domain related to the user defined pointer at the time of the establishment of said user defined pointer;
an access control means for controlling the access of at least two users to the system;
a user position detection device for detecting a movement of the user from one of the sub-domains to another, the user position detection device being adapted to, upon detecting movement of the user from a first of the sub-domains to a second of the sub-domains automatically have units of information rendered in the first sub-domain rendered in the second sub-domain,
the access control means being adapted to receive unique identification data from a user and further comprising, for at least some of the sub-domains of the system, a defined hierarchy of users,
the access control system being adapted to, on the basis of the received identification data and the hierarchy, allow rendering of units of information in a specific sub-domain only in case said sub-domain is not in use for rendering units of information by another user having a superior hierarchy position.

14. The system according to claim 13, wherein said user defined pointer refers to at least one of said units of information being rendered in the sub-domain related to the user defined pointer at the time of the establishment of the user defined pointer.

15. The system according to claim 13, wherein at least two of said sub-domains each comprises one or more audio rendering units for outputting said units of information to a user.

16. The system according to claim 13, wherein at least two of said sub-domains each comprises visual rendering units for outputting said units of information to a user.

17. The system according to claim 13 further comprising:
a storage structure connected to the data communication network {4~M~, wherein units of information are stored in said storage structure and retrieved there from.

18. The system according to claim 13, further comprising:
at least one portable unit constituting an integrated user activated unit and a sub-domain selector.

19. The system according to claim 13, wherein the access control means selectively allows said user to establish a user defined pointer relating to a specific sub-domain.

20. The system according to claim 13, wherein the access control means selectively allows the rendering of specific units of information in a sub-domain selected by said user.

* * * * *